United States Patent [19]

Kawamura et al.

[11] Patent Number: 4,866,541

[45] Date of Patent: Sep. 12, 1989

[54] ERASING OF INFORMATION SIGNAL FROM AN OPTICAL DISK

[75] Inventors: Shinobu Kawamura, Tokyo; Tadao Nagai, Sagamiko, both of Japan

[73] Assignee: TEAC Corporation, Japan

[21] Appl. No.: 208,876

[22] Filed: Jun. 20, 1988

[30] Foreign Application Priority Data

Jun. 22, 1987 [JP] Japan ............................. 62-155131

[51] Int. Cl.⁴ .................................................. G11B 7/00
[52] U.S. Cl. ...................................... 358/342; 369/127
[58] Field of Search ................. 358/335, 342; 369/44, 369/129

[56] References Cited

U.S. PATENT DOCUMENTS

| | | | |
|---|---|---|---|
| 4,598,394 | 7/1986 | Nonaka | 358/342 |
| 4,609,948 | 9/1986 | Okano | 358/342 |
| 4,706,133 | 11/1987 | Giddings | 358/342 |
| 4,727,432 | 2/1988 | Hosaka | 358/342 |
| 4,796,103 | 1/1989 | Tokuyama | 358/335 |
| 4,802,020 | 1/1989 | Miyake et al. | 358/342 |

Primary Examiner—Robert L. Richardson
Assistant Examiner—W. Daniel Swayze, Jr.
Attorney, Agent, or Firm—Andrus, Sceales, Starke & Sawall

[57] ABSTRACT

A control circuit for controlling the erasing of an information signal recorded on an optical disk such that the information signal is erased except for the vertical blanking interval and for the interval corresponding to the address signal of the information on the disk. The rest of the information signal including the horizontal synchronizing signal is erased either continuously or intermittently or is not erased. The circuit produces a control signal which assumes a first logical state for enabling the erasing and a second logical state for disabling the erasing responsive to a horizontal synchronizing signal, a vertical synchronizing signal and a command signal commanding the erasing of a particular information signal on the disk.

7 Claims, 2 Drawing Sheets

ERASING OF INFORMATION SIGNAL FROM AN OPTICAL DISK

BACKGROUND OF THE INVENTION

The present invention generally relates to erasing of an information signal recorded on an optical disk, and in particular a control circuit for controlling the erasing of the video signal recorded on an optical disc so that a desired video signal recorded on a specified track portion of the optical disk is selectively erased.

Optical disks are commonly used as a recording medium having a high recording density and a large capacity. Such an optical disk has an advantage in that the access time for accessing a desired information is significantly less as compared to the case when using a magnetic tape.

One typical example of the use of the optical disk is the recording of numerous still pictures for the purpose of filing. In such an application, there is a case in which a user wishes to record new information by erasing the prerecorded information already recorded on the optical disk. When a rewritable optical disk is used, such erasing is achieved relatively simply. There is another type of optical disk called a write-once type disk in which the information signal can be recorded only once. No rewriting of the information signal is possible in such a disk. Such an optical disk is used commonly. In using the write-once type optical disk, there also is a case that a particular picture should be erased so that the picture is no longer reproduced. In such a case, the information signal on a track portion of the optical disk should be erased without deteriorating other recorded signals.

When selectively erasing an information signal prerecorded on a particular portion of the track of the write once type optical disk, firstly the track portion on which the information signal to be erased is recorded is searched. The track portion is then irradiated with an optical beam which destroys the surface of the optical disk and the recorded information is erased. However, such a procedure significantly reduces the reflectivity of the surface of the optical disk in the vicinity of the track along which the surface of the optical disk is destroyed. This results in an instability in the tracking servo control or focusing servo control of the reproducing system when an information signal recorded on a track locating in a vicinity of the erased track is reproduced. Further, a so called jumping of the optical probe, which is a quick movement across the track of an optical probe produced by a reproducing head for reproduction of the recorded signal, becomes unstable when the jumping is made across the erased track which is not recorded with information signal.

Such an unstable jumping of the optical probe can be improved when an optical disk as disclosed in the commonly owned U.S. patent application Ser. No. 917,188 is used in which the assignee of the present application is the assignee. In such an optical disk, a series of address signals are recorded at the time of manufacturing of the optical disk along a row of pits forming a guide track, and the erasing of the information signal is performed so that the address signals recorded on the guide track are not erased. However, even in use of such an optical disk, the waveform of the reproduced address signal reproduced from the guide track portion adjacent to the erased track portion is modified as a result of erasing. Thus, there tends to be a problem of unstable operation when accessing prerecorded track portion in the optical disk in which some of the informations is erased.

SUMMARY OF THE INVENTION

Accordingly, it is a general object of the present invention to provide a novel and useful control circuit for controlling the erasing of an optical disk in which the problems aforementioned are eliminated.

Another and more specific object of the present invention is to provide a control circuit for controlling the erasing of prerecorded signals on an optical disk so that the servo control or jumping operation of the optical probe is not affected in the subsequent reproduction.

Another object of the present invention is to provide a control circuit for controlling the erasing of composite video signals recorded on an optical disk along a recording track formed on the surface of the disk together with address signals indicating the address of track portions on which the composite video signals are recorded such that a specified composite video signal is erased from a specified track portion except for a predetermined interval which includes a recording track portion at which an optical probe from a reproducing head is jumped across the track and another recording track portion on which the aforementioned address signal is recorded. According to the present invention, the composite video signal recorded in the aforementioned predetermined interval is not erased and the decrease in the intensity of the reflected light is less significant as compared with the case in which a whole one frame of the composite video signal is erased. As a result, the stable jumping of the optical probe is achieved. Further, the recorded address signal is not modified as a result of erasing. As a result, random accessing of the desired track portion is achieved as accurately as before even after the erasing of the prerecorded video signals.

Another object of the present invention is to provide a control circuit for controlling the erasing of a composite video signal recorded on an optical disk along a recording track such that the erasing is performed continuously along the recording track except for those intervals in which the optical probe from a reproducing head is jumped across the track and for those intervals on which there are recorded address signals indicating the address of respective track portions. According to the present invention, the unwanted video signal is erased completely and further reproduction of the erased video signal is no longer possible.

Another object of the present invention is to provide a control circuit for controlling the erasing of a composite video signal recorded on an optical disk along a recording track formed on the surface of the disk such that only the signals recorded on a track portion corresponding to the horizontal blanking interval is erased. According to the present invention, the horizontal synchronization of the reproduced picture displayed on a monitor display is lost and the recognition of the reproduced picture becomes difficult, although the video signal itself is not completely erased from the optical disk. Further, the present invention reduces the degree of reduction of the intensity of the reflected light which is essential for proper focusing and servo control of the optical disk and the optical probe. As a result, the focusing or tracking servo control during a subsequent reproducing operation is not deteriorated.

Another object of the present invention is to provide a control circuit for controlling the erasing of a composite video signal recorded on an optical disk along a recording track formed on the surface of the disk such that the composite video signal recorded on a track portion corresponding to the horizontal blanking interval is erased and that the signals recorded on the rest of the track portion are erased intermittently at a plurality of locations along the track portion. According to the present invention, the decrease in intensity of the reflected light due to the erased track portion is less significant, and the recognition of the erased video information becomes virtually impossible. As a result, an equivalent effect to that of erasing of the unwanted information is achieved without losing the servo control of the disk and the optical probe.

Still other objects and further features of the present invention will become apparent from the following detailed description when read in conjunction with the attached drawings.

DETAILED DESCRIPTION

Figure 1:
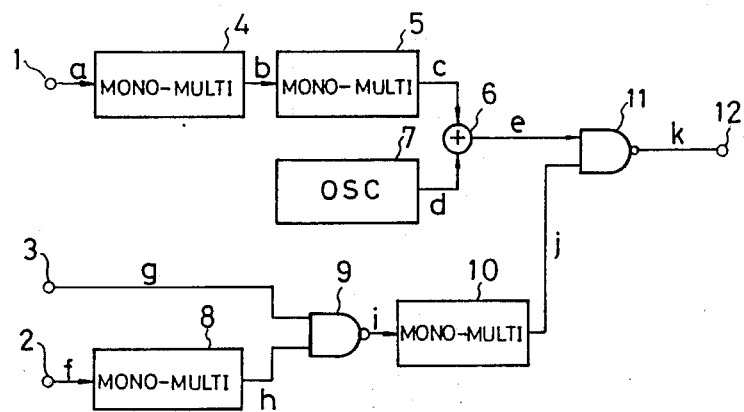
FIG. 1 is a circuit block diagram showing an embodiment of the circuit of the present invention.
Figure 2:
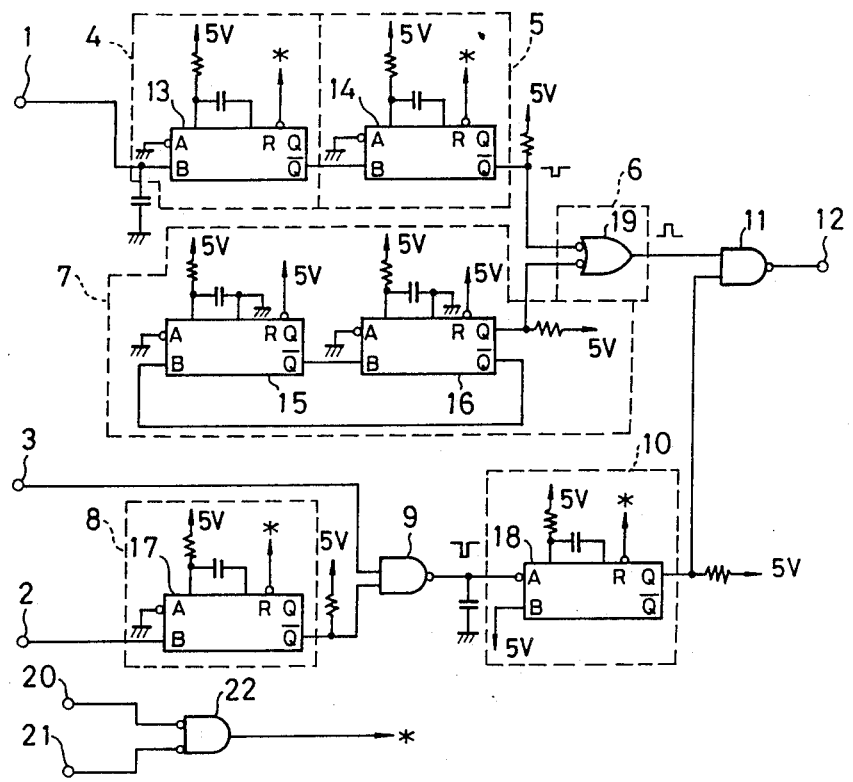
FIG. 2 is a detailed circuit diagram showing the first embodiment of the circuit of the present invention.

FIG. 1 is a circuit block diagram showing an embodiment of the circuit of the present invention, and FIG. 2 is a detailed circuit diagram of the circuit. In the drawings, corresponding portions in FIG. 1 and FIG. 2 are designated with identical reference numerals.

Referring to FIGS. 1 and 2, a horizontal synchronizing signal produced in a reproducing system of an optical disk recording and reproducing apparatus (not shown) is applied to an input terminal 1, and a vertical synchronizing signal produced in a reproducing system of the recording and reproducing apparatus is applied to an input terminal 2. Further, a command signal commanding the erasing of a specified composite video signal recorded on the optical disk is produced by a micro computer and the like (not shown) responsive to the instruction of the user and is supplied to an input terminal 3. The horizontal synchronizing signal applied to the input terminal 1 has a waveform and timing as shown by a signal a in FIG. 3 (A), and the vertical synchronizing signal to the input terminal 2 has a waveform and timing as shown by a signal f in FIG. 3(C). Further, the waveform and timing of the command signal is represented by a signal g in FIG. 3(C). It should be noted that the scale of the time base is common for the signals within a same drawing but is different for signals not within the same drawing.

In the description hereinafter, the present invention will be described with reference to an optical disk as disclosed in a commonly owned U.S. patent application Ser. No. 873,407 in which the assignee of the present invention is the assignee. Such an optical disk is formed with a guide track comprising a row of pits provided on its surface, and an address signal indicating the address of a track portion corresponding to a frame of the composite video signal is recorded on the disk at a portion locating between a pit and an adjacent pit. In other words, such an optical disk has the guide track comprising a row of pits aligned along the recording track, and each of the pits is located in a region of the disk defined along the track for a length corresponding to a same angular distance with reference to the center of the disk. Along the recording track, a pair of such guide tracks are formed at both sides of the recording track and the pits in one of the two adjacent guide tracks are located alternately to the pits in the other of the guide tracks. In other words, the position of the pits in a pair of guide tracks associated with the recording track is displaced alternately to a radially outward direction and to a radially inward direction when viewed along the direction of the track.

Figure 4:
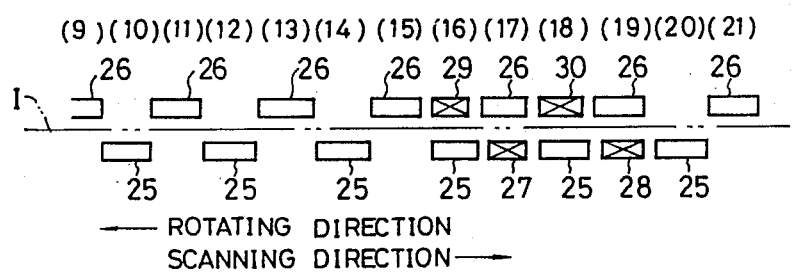
FIG. 4 is a plan view showing a portion of the optical disk to which the present invention is applicable.

FIG. 4 shows a part of the recording track formed on an optical disk designed for a constant angular velocity system in which the optical disk is driven at a constant speed. In the drawing, the recording track is illustrated by a two-dotted line I. Further, a row of pits 25 constituting one of the guide tracks is formed on the disk at an inner side (lower side in the drawing) of the track I. The distance between the adjacent pits is chosen so that interval between the pits corresponds to the horizontal scanning interval H. Furthermore, a row of pits 26 constituting the other of the guide tracks is formed on the disk at an outer side (upper side in the drawing) of the track I with the interval corresponding to the horizontal scanning interval H. It should be noted that the pit 25 and 26 are displaced alternately toward the inward direction and the outward direction when viewed along the recording track.

FIG. 4 further shows address signal recording portions 27–30 which is designated by a symbol X. The address signal recording portions 27 and 28 are formed between three successive pits 25 forming the guide track which is located at an inward position relative to the recording track. The address signal recording portions 29 and 30 are formed between three successive of pits 26 forming the guide track which is located at an outward position relative to the recording track. The address signals recorded on the portions 27 and 28 are identical to each other and the address signals recorded on the portions 29 and 30 are identical to each other. Thus, a same address signal is recorded twice on the guide track portion in one revolution of the optical disk at the time of manufacturing of the optical disk. Such a recording of the address signal is provided for the purpose of error checking. The address signals recorded on the address signal recording portions 27–30 are recorded after being modulated according to a suitable modulation procedure such as phase encoding.

When recording an information signal, the address signal recording portions 27–30 are scanned by a sub-optical probe from the reproducing head and the rotational phase of the optical disk is controlled by controlling the rotation of a driving motor (not shown) of the disk responsive to an error voltage signal which represents a phase difference between a pulse representing the rising edge of the reproduced address signal on the address signal recording portion 29 and a pulse corresponding to the frame pulse obtained from the vertical synchronizing signal of the composite video signal to be recorded. It should be noted that the address signal on the address signal recording portion 29 is the address signal which is reproduced at first by the scanning of the sub-optical probe. While the rotational phase of the optical disk is maintained as such, a main optical beam is produced by a recording head and a predetermined information signal is recorded as a row of pits on the portion of the track represented by the two dotted line I in FIG. 4. Two fields of information signals are recorded on the track portion extending for one revolution of the optical disk. The numbers bracketed in FIG. 4 represent the number of the scanning lines of the composite video signal to be recorded. As can be seen in the drawing, the composite video signal is recorded such that a particular portion of the vertical blanking interval of the composite video signal corresponds to the address signal recording portions 27–30.

When searching the information signals recorded on the optical disk, the optical probe from the reproducing head must be jumped across the track. Such a jump of the optical probe is achieved once or twice in one revolution of the optical disk. In order to avoid the appearance of noise associated with the jump, the jump is performed during the vertical blanking interval of the reproduced picture.

The control circuit of the present invention controls the erasing of the prerecorded composite video signals on the optical disk such that the signals recorded in a vicinity of the address signal recording portions 27–30 and the signals in the vertical blanking interval at which the jump is made are not erased.

It should be noted that the address signal recording portions 27 and 28 (or 29 and 30) are recorded with an address signal indicating the number of the recording track represented by the two-dotted line I. In other words, the address signal represents the number of the frame. Because of this reason, the address is called a frame address. This frame address is reproduced twice in one revolution of the optical disk.

Figure 3:
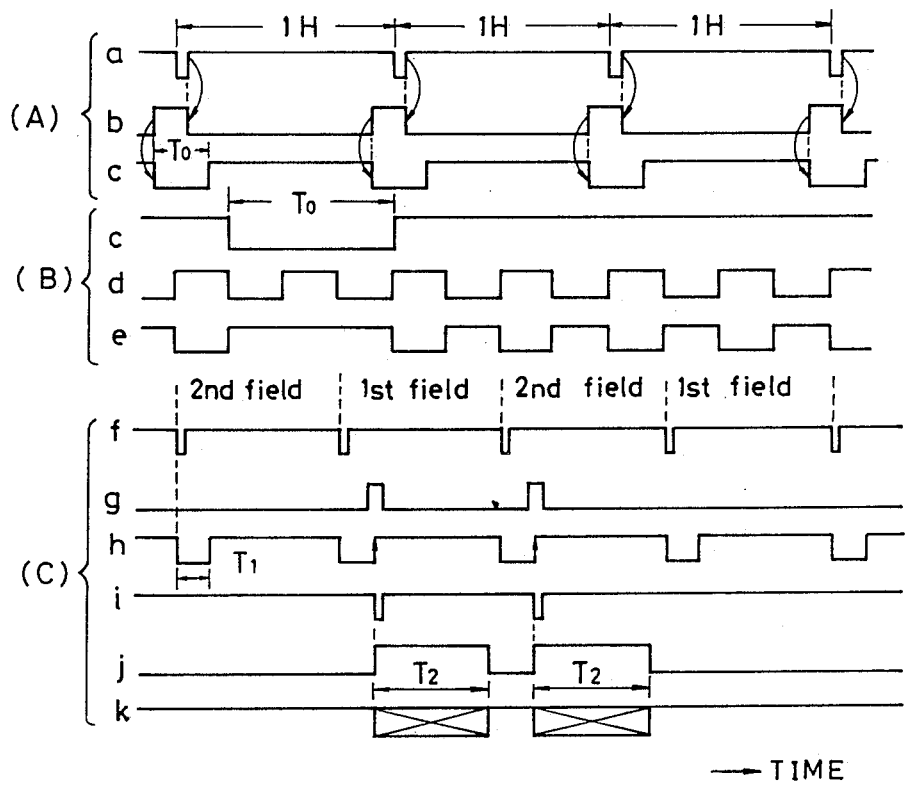
FIGS. 3 (A)–(C) are timing charts for explanation of the operation of the circuit of FIGS. 1 and 2.

Referring to FIG. 3, the horizontal scanning signal a and the vertical synchronizing signal f are synchronized with the horizontal and vertical synchronizing signals recorded on the optical disk on the basis of the timing of the reproduced frame address signal. This horizontal synchronizing signal a is supplied to a monostable multivibrator 4 which produces an output pulse b shown in FIG. 3 (A) which assumes a low level state for a predetermined period and changes into a high level state responsive to the beginning of the horizontal blanking interval of the next horizontal synchronizing signal.

The output signal b is supplied to a monostable multivibrator 5 and triggers the monostable multivibrator 5 at its rising edge. The monostable multivibrator 5 in turn produces an output pulse c which assumes a low level state for an interval T0 corresponding to the horizontal blanking interval as shown in FIGS. 3(A) and 3(B). This output pulse c is supplied to a summing circuit 6. The interval T0 is chosen for example as 15 $\mu$s. The circuit 6 adds together the output pulse c and an output pulse d shown in FIG. 3 (B) produced by an oscillator 7.

The monostable multivibrators 4 and 5 are constructed from integrated circuits 13 and 14. The oscillator 7 is constructed by a pair of retriggerable monostable multivibrators 15 and 16 which are connected so as to form a positive feedback loop. The oscillator 7 produces an output signal d as shown in FIG. 3 (B) which is a square wave having a duty cycle of 50 %. This output signal d changes in state periodically, and the period of repetition may be chosen as 10 $\mu$s (5 $\mu$s for each half period), for example. The summing circuit 6 is constructed from a dual input NAND circuit 19 as shown in FIG. 2. Thus, the summing circuit 6 (NAND circuit 19) produces an output pulse e which assumes a high level state when the output pulse c assumes the low level state. Further, the output pulse e forms a pulse train having a phase which is inverted to the phase of the output pulse d of the oscillator during the interval in which the output pulse c assumes the high level state.

The vertical synchronizing signal f is supplied to a monostable multivibrator 8 constructed by an integrated circuit 17. The multivibrator 8 produces an output pulse h which assumes a low level state during a predetermined interval T1 which starts at the down-going edge of the vertical synchronizing signal f and ends at the end of the vertical blanking interval. The output signal h and the aforementioned erasing command signal g applied to the input terminal 3 are supplied to respective input ports of a dual input NAND circuit 9. It should be noted that the erasing command signal g is a signal which changes in level from a low level state to a high level state at the end of the two consecutive vertical blanking intervals which define the beginning of the first and second field of the composite video signal to be erased.

The NAND circuit 9 produces an output pulse i having a negative polarity responsive to the input of the erasing command signal. The output pulse i is supplied to a terminal A of the monostable multivibrator 10 constructed from an integrated circuit 18 and triggers the monostable multivibrator 10 by the down going edge of the output pulse i. Responsive to the triggering, the monostable multivibrator 10 produces an output pulse j which assumes a low level state responsive to the down-going edge of the pulse i and continuing for a predetermined period T2 at its output terminal Q. It should be noted that the predetermined period T2 is chosen such that the period T2 corresponds to one field of the composite video signal excluding the interval of the vertical blanking interval.

Further, a dual input gate circuit 22 is provided which is supplied with a detection signal indicating the failure of reproduction of the video signal and another detection signal indicating the locking of the disk servo control and produces an output signal which resets the monostable multivibrators 4, 5, 8 and 10.

The output signal e of the summing circuit 6 and the output signal j of the monostable multivibrator 10 are supplied to a dual input NAND circuit 11 which performs a NOT-AND operation of the supplied signals and produces an output pulse k which assumes a high level state when the pulse j assumes the high level state as shown in FIG. 3(C). On the other hand, when the output pulse j assumes the low level state, the output pulse k takes a form of a pulse train which is an inversion of the output pulse e. This output pulse k of the NAND circuit 11 is supplied to the the recording and reproducing apparatus (not shown) via an output terminal 12 and controls the operation of the recording system in the apparatus such that recording is enabled only when the output pulse k assumes the low level state. The recording operation is disabled as long as the output pulse k assumes the high level state.

At the time of recording, a driving signal having a predetermined frequency is obtained from a frequency modulator for modulating the luminance signal and this driving signal is supplied to a laser diode. Thereby, the output optical beam is produced and the produced optical beam destroys the portion of the recording track on which the video signal to be erased is recorded. This overlapped recording makes the reproduction of the informations prerecorded on the recording track portion impossible. In other words, the information is destroyed and erased from the optical disk.

During the erasing, the frequency of the driving signal supplied to the laser diode is chosen such that the frequency of the driving signal does not coincide with the synctip frequency of the frequency modulated luminance signal recorded on the disk. Preferably, the frequency of the driving signal is chosen to be a free running frequency of the frequency modulator which corresponds to the grey level of the composite video signal. The reason for avoiding the synctip frequency is that the synctip frequency recorded on the disk may reestablish the horizontal synchronization of the signals which is subjected to the overlapped recording. When the horizontal synchronization is reestablished, there is a possibility that the picture reproduced from the erased track can be recognized even though the picture quality is greatly deteriorated.

Thus, one frame of the composite video signal recorded on a predetermined track portion of the optical disk is erased for an interval T2 except for the interval corresponding to the vertical blanking interval responsive to the erasing command signal g. In this mode of operation, the erasing is performed by overlapped recording of the optical beam for the interval T0 which includes the horizontal blanking interval. Further, the video signal for the rest of the interval is also erased by overlapped recording which is performed intermittently with a repetition period of 10 μs in which 5 μs for the erasing interval and another 5 μs for the nonerasing interval.

As a result of such erasing, the horizontal scanning signal is not reproduced in the subsequent reproduction and the the horizontal synchronization is eliminated from the picture displayed on the screen of the display device. Further, the video signal is erased intermittently in each 5 μs interval. As a result, the recognition of the original picture becomes virtually impossible.

As a result of the intermittent erasing of the video signal, the loss of the reflected optical signal in the erased track portion takes place only intermittently and the decrease in the quantity of the reflected light is less significant as compared to the case in which the entire composite video signal is erased. Therefore, the focusing servo control and tracking servo control are performed without any problems in the subsequent reproduction. Further, the reproduction of the address signal or the jumping of the optical probe can be performed as accurately and reliably as before, as the signals in the vertical blanking interval are not erased.

It is preferred that the intermittent erasing of the video signal is performed intermittently with the interval of repetition chosen substantially equal to 5 μs. When the length of the erasing interval in each of the intermittent erasing operation is too long or too short as compared to 5 μs, the risk of the reproduced picture being recognized becomes higher.

Within the scope of the present invention, the following two modifications of the circuit are possible.

In a first modification, the video signal is erased continuously during the aforementioned interval T2. According to this modification, the monostable multivibrators 4 and 5, summing circuit 6, oscillator 7, and the NAND circuit 11 can be omitted and the circuit construction becomes simple, although the servo control operation becomes slightly unstable due to the decrease in the amount of the reflected light. In this modification, there is a further advantage in that the reproduction of the video signals thus erased is totally impossible. From the view point of control of the file, this modification is highly effective.

In a second modification, the summing circuit 6 and the oscillator 7 are eliminated. The circuit erases the video signal only for the predetermined interval T0 including the horizontal blanking interval repeatedly during the aforementioned interval T2. According to the present modification, the horizontal synchronizing signal is erased and the recognition of the reproduced picture becomes difficult because of the loss of the horizontal synchronization in the picture displayed in the display device, even though the video signal itself is not erased from the optical disk. In this modification, the decrease in the amount of the reflected light is negligible and a highly stable servo control operation can be achieved.

The present invention can be applied to rewritable type optical disks similarly as for the case of the write-once type optical disks. Further, the present invention is also applicable to the optical disks driven in accordance with the so called continuous linear velocity driving system in which the rotational speed of the disk is controlled so that the linear velocity of the track portion scanned by the optical probe is maintained constant. As such an optical disk is not recorded with the address signal, only the signal corresponding to the horizontal synchronizing interval is erased when the circuit of the present invention is applied to such an optical disk.

Further, the signal recorded on the optical disk is not limited to the composite video signal but may be a multiplexed composite video signal which is a composite video signal multiplexed with an audio signal modulated in accordance with a predetermined modulation procedure. Further, the signal may be any other information signal.

Further, the present invention is not limited to these embodiments, but various variations and modifications may be made without departing from the scope of the present invention.

What is claimed is:

1. A circuit for use in an optical disk recording and reproducing apparatus for controlling the recording of a predetermined recording signal on an optical disk already recorded with a composite video signal along a recording track so that said predetermined recording signal is overlapped on the prerecorded composite video signal comprising:

first circuit means supplied with a first synchronizing signal which is synchronized in phase with a vertical synchronizing signal of a reproduced composite signal and for producing, responsive thereto, an output pulse which continues until to an end of a vertical blanking interval which corresponds to the supplied first logical product means which is on one hand supplied with a command signal comprising a pair of consecutive pulses respectively corresponding to the end of a pair of vertical blanking intervals each defining a beginning of the first and second fields of one frame of composite video signal already recorded on a portion of the recording track on which the predetermined recording signal is to be recorded at a first input port and on the other hand supplied with the output pulse of the first circuit means at a second input port for producing an output signal representing the logical product of the signals applied to the first and second input ports; and second circuit means triggered with the output signal of the logical product means for producing an output signal having a first logical state until the beginning of the next vertical blanking interval and a second logical state responsive to the beginning of said next vertical blanking interval, said output signal of the second circuit means controls the recording of the predetermined recording signal such that the recording is made when the output signal assumes the first logical state and the recording is not made when the output signal assumes the second logical state.

2. A circuit as claimed in claim 1 in which said logical product means is a NAND circuit.

3. A circuit as claimed in claim 1 further comprising signal processing means supplied with a second synchronizing signal synchronized in phase to a horizontal synchronizing signal in the reproduced composite video signal for producing an output pulse corresponding to a horizontal blanking interval, and second logical product means for producing an output signal which represents the logical product of the output signal of the signal processing means pulse and the output signal of the second circuit means.

4. A circuit as claimed in claim 3 in which said signal processing means comprises third circuit means supplied with the second synchronizing signal for producing an output pulse which continues until the beginning of a horizontal blanking interval corresponding to another second synchronizing signal which immediately follows said supplied second synchronizing signal, and fourth circuit means triggered by the output signal of the third circuit means for producing an output pulse substantially corresponding to the horizontal blanking interval.

5. A circuit as claimed in claim 1 further comprising signal processing means supplied wish a second synchronizing signal which is synchronized in phase to the horizontal synchronizing signal in a reproduced composite video signal for producing an output pulse corresponding to the horizontal blanking interval, an oscillator for generating a symmetrical square wave output signal having a duty cycle of substantially 50 %, logical sum means for producing an output signal representing the logical sum of the output pulse of the signal processing means and the output signal of the oscillator, and second logical product means for producing an output signal representing a logical product of the output signal of the logical sum means and the output signal of the second circuit means.

6. A circuit as claimed in claim 5 in which the output signal produced by the oscillator is a square wave which is inverted in each 5 $\mu$s.

7. A circuit as claimed in claim 4 further comprising third logical product means supplied with a first detection signal indicating the absence of the reproduced composite video signal and a second detection signal indicating the locking of a disc driving servo control circuit in the recording and reproducing apparatus for producing an output signal which represents the logical product of the first and second detection signals, said output signal of the third logical product means being supplied to each of the first, second, third and fourth circuit means for resetting the circuit means in such a case that the composite video signal is not reproduced and the disc driving servo control circuit is locked.

* * * * *

UNITED STATES PATENT AND TRADEMARK OFFICE
CERTIFICATE OF CORRECTION

PATENT NO. : 4,866,541

DATED : September 12, 1989

INVENTOR(S) : Shinobu Kawamura et al

It is certified that error appears in the above-identified patent and that said Letters Patent is hereby corrected as shown below:

Column 8, line 56    after "first" insert ---synchronizing signal;---

Column 10, line 4    delete "wish" and substitute therefor ---with---

Signed and Sealed this

Twenty-third Day of July, 1991

*Attest:*

HARRY F. MANBECK, JR.

*Attesting Officer*    *Commissioner of Patents and Trademarks*